R. D. MAINE.
POTATO SLICER AND SHREDDER.
APPLICATION FILED OCT. 13, 1920.
1,416,853.
Patented May 23, 1922.
2 SHEETS—SHEET 1.
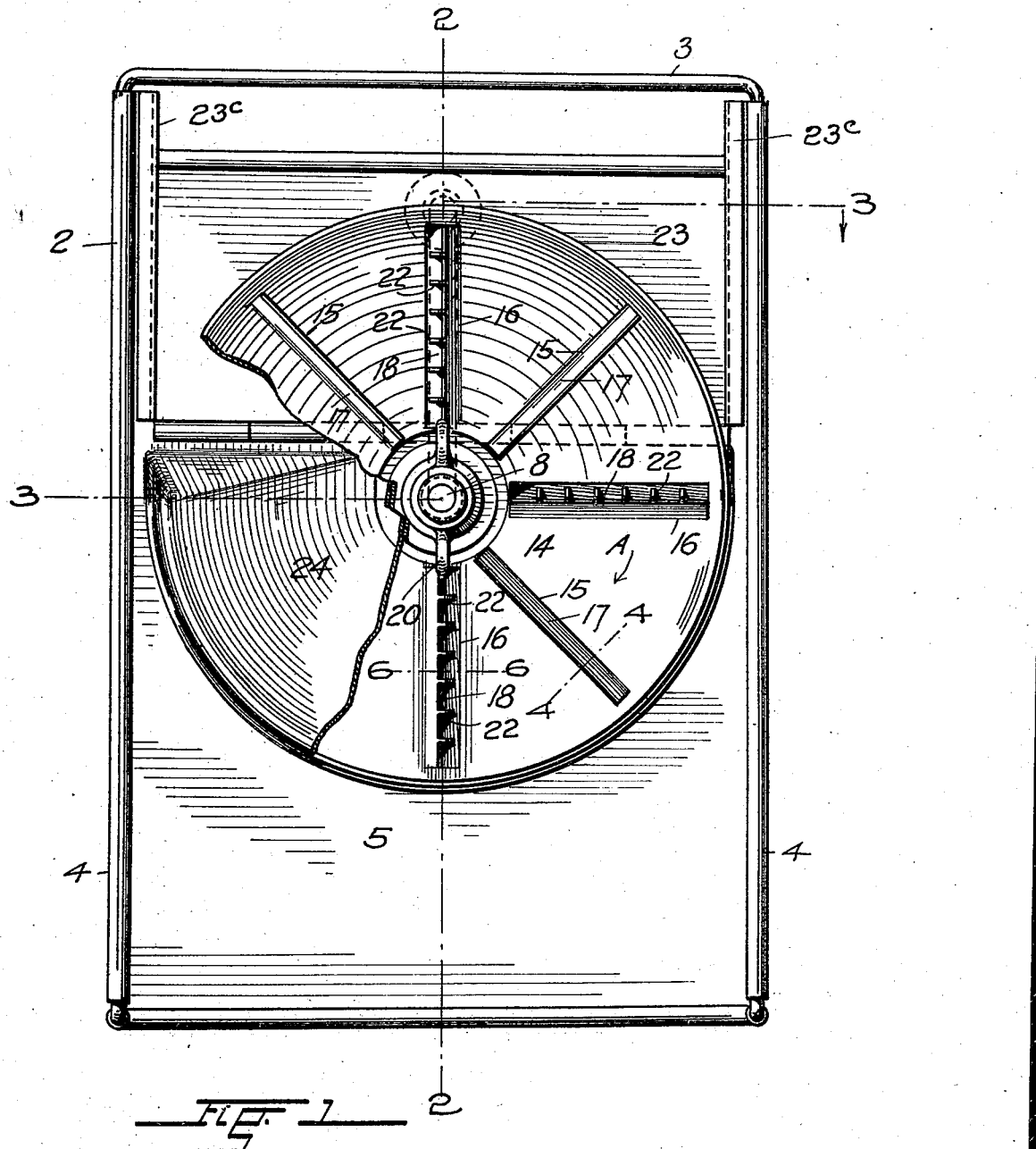
INVENTOR.
R. D. MAINE.
BY
ATTORNEY.

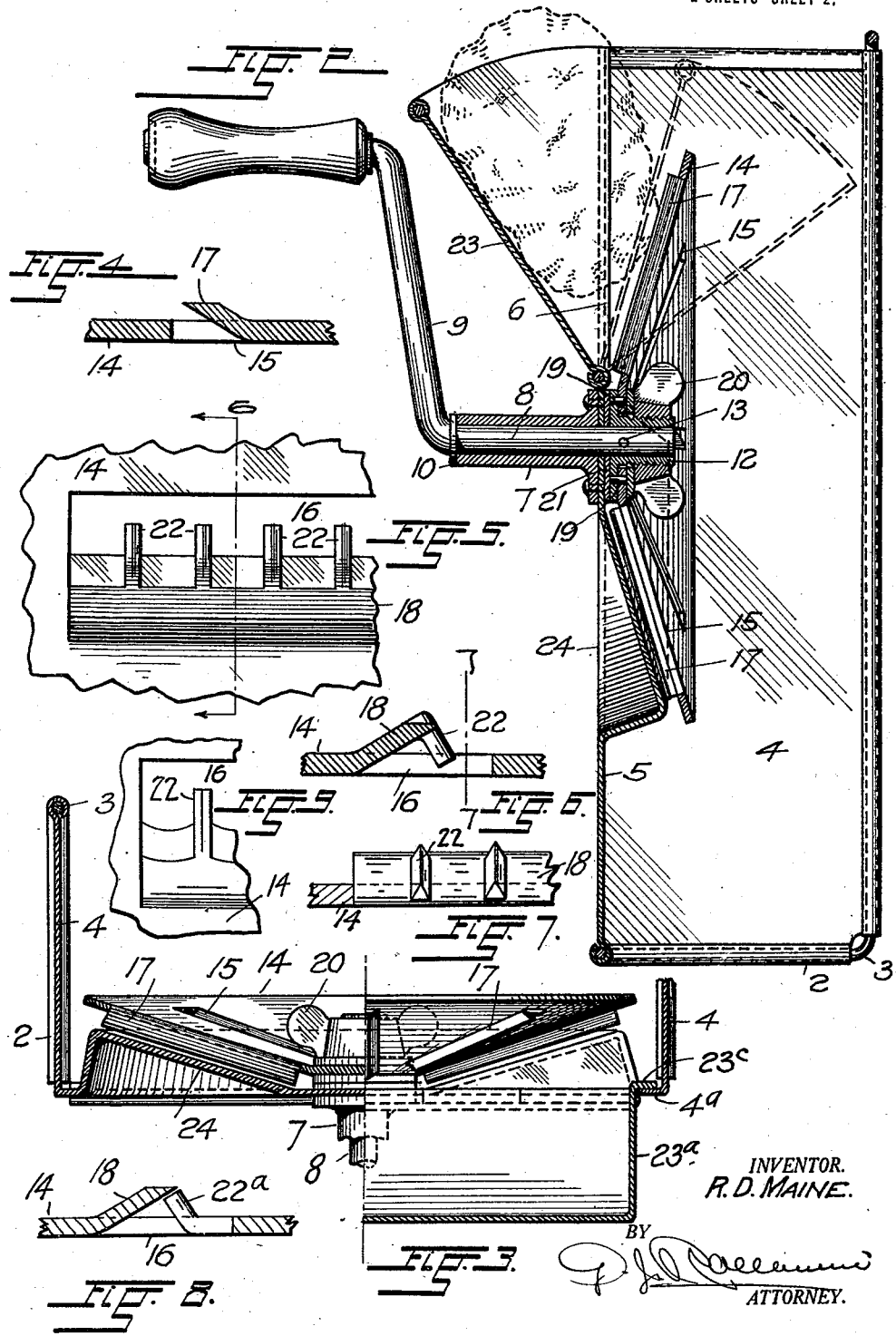

UNITED STATES PATENT OFFICE.

ROY D. MAINE, OF CHEYENNE, WYOMING.

POTATO SLICER AND SHREDDER.

1,416,853.  Specification of Letters Patent.  Patented May 23, 1922.

Application filed October 13, 1920. Serial No. 416,652.

*To all whom it may concern:*

Be it known that I, ROY D. MAINE, a citizen of the United States, residing at Cheyenne, in the county of Laramie and State of Wyoming, have invented certain new and useful Improvements in Potato Slicers and Shredders, of which the following is a specification.

This invention relates to potato slicers and shredders, and an object of the invention is to provide a utensil of simple construction which is adapted to either slice or shred potatoes by the rotary movement of a cutting member.

Another object of the invention is to provide in a device of this character, a cutting member which slices the potatoes by its rotation in one direction and shreds the same when it is rotated in the opposite direction.

Still other objects of the invention reside in details of construction and arrangements of parts, all of which will fully appear in the course of the following description.

In the accompanying drawings in the various views of which like parts are similarly designated, Figure 1 represents a partially sectional rear elevation of the utensil;

Figure 2, a longitudinal section taken on the line 2—2, Figure 1;

Figure 3, a fragmentary transverse section on the line 3—3, Figure 1;

Figure 4, a section on the line 4—4, Figure 1 showing the construction of the slicing blades of the cutting member, drawn to an enlarged scale;

Figure 5, an enlarged fragmentary elevation of one of the shredding blades of the cutting element;

Figure 6, a section taken on the line 6—6, Figures 1 and 5;

Figure 7, a section taken on the line 7—7, Figure 6;

Figure 8, a section similar to Figure 6 showing a modified construction of the shredding blades, and Figure 9, an elevation similar to that shown in Figure 5, showing another modification of the same.

Referring more specifically to the drawings, the reference character 2 designates a holder upon which the operating mechanism of the utensil is mounted and which is adapted to be held above or in a vessel intended to receive the sliced or shredded product.

The holder in its preferred form, consists of a rectangular wire frame 3, supporting parallel side plates 4 and a front plate 5 the latter covering the lower portion of the frame only to provide an opening 6 through which the potatoes are fed onto the cutting member of the device.

Fastened centrally at the upper edge of the front plate is a forwardly extending bearing 7 for the support of a spindle 8 at the end of a hand-crank 9. The spindle has at its forward end a collar 10 which engages the end of the bearing and it carries at its end portion extending inwardly from the front plate of the holder, a flanged and exteriorly threaded sleeve 12 which is rigidly secured to the spindle by means of a transverse pin 13.

The cutting member of the device consists in its preferred form, of a concavo-convex circular plate 14 having radial slots 15 and 16 and integral cutting blades 17 and 18 which extend slantingly along an edge thereof.

The disk has a central opening to admit the threaded portion of the sleeve at the end of the spindle and it is connected to the flange of the sleeve by means of dowel pins 19.

The cutting member is held in place on the spindle by a wing-nut 20 screwed upon the threaded end of the sleeve and a gasket 21 of anti-friction material is placed between the flange of the sleeve and the inner surface of the front plate of the holder to facilitate the rotary motion of the spindle.

The radial slots 15 and 16 of the cutting member are of different widths and placed equidistantly in alternate relation to each other, and the respective cutting blades 17 and 18 slant outwardly from the slots beyond the convex surface of the member.

The blades 17 slant forwardly from the edges of the respective slots with relation to the rotary movement of the member in one direction and are adapted to divide a potato pressed against the convex surface of the member into slices which pass through the slots and fall into the receptacle over which the utensil is held, and the blades 18 slant from the opposite edges of their respective slots in the opposite direction for the purpose of dividing the potatoes into strips or shreds when the rotary movement of the cutting member is reversed.

The blades 18 are to this end provided with a plurality of equidistant sharp-edged teeth 22 which extend from their cutting edges over the slots as best shown in Figures 5 to 7 of the drawings.

In the modified form of the shredding blades shown in Figure 8, the teeth 22ª are formed integral at the edge of the slot opposite to that from which the blade projects, and slant toward the cutting edge thereof, and in the modification illustrated in Figure 9 the cutting edges of the shredding blades are curved between the cutting teeth to vary the form of the shreds into which the potatoes are divided.

In order to facilitate the feeding movement of the potatoes onto the convex surface of the cutting member, a tray 23 is hinged at the upper edge of the front plate of the holder with its sides 23ª extending into the feed-opening thereof.

The side plates of the holder at the feed-opening have inwardly extending flanges 4ª and the sides of the tray have corresponding flanges 23ᶜ which by engagement with the others limit the outward movement of the tray.

The portion of the front plate of the holder below the bearing 8 is bent inwardly to provide a baffle 24 conforming with the convex surface of the cutting member, which serves in the operation of the device to support pieces of potato for the action of the cutting blades when they are too small to be held in the tray 23.

In the operation of the utensil the holder is held over a receptacle in a substantially upright position and a rotary movement is imparted to the cutting member by means of the hand-crank 9 while a potato supported in the hinged tray 23 is gently pressed against the working surface of the same.

When the cutting member is rotated in the direction of the arrow A, Figure 1, the forwardly slanting blades 17 divide the potato into slices which pass through the slots 15 along which the blades are formed, while the shredding blades 18 which slant in the opposite direction, pass inactively across the potato.

When the rotary movement of the member is reversed the cutting blades 17 will move ineffectively across the potato and the cutting blades 18 in conjunction with the transverse teeth 22, divide the potato into shreds or strips which pass through the slots 16 of the member into the receptacle over which it is held.

Having thus described my improved slicer and shredder, it will be apparent that while it is particularly adapted for cutting potatoes it may be used to advantage in slicing other vegetables and fruits, and I desire it understood that variations in the construction and arrangement of the parts of the device may be resorted to within the spirit of my invention as defined in the following claims:

What I claim is:

1. A potato slicer and shredder comprising a holder having a feed-opening, a cutting member mounted on the holder for rotation about a horizontal axis and adapted to engage a potato passing through said opening, and a baffle on the holder below the feed-opening for the support of matter passing the working face of the cutting member.

2. In a potato slicer and shredder, a rotary cutting member having a slot, a cutting blade slanting outwardly from an edge of the slot and having a straight cutting edge above the same, and a plurality of teeth projecting inwardly from said blade across said slot and having cutting edges transverse to the cutting edge of the blade.

3. In a potato slicer and shredder, a disk mounted for rotation in either direction, a series of cutting blades slanting from the surface of said disk in one direction and having cutting edges adapting them for slicing, and a series of cutting blades slanting from the surface of the disk in the opposite direction and having cutting edges and relatively transverse teeth adapting them for shredding, the disk having a separate slot for each of said blades extending beneath the cutting edges thereof.

4. A potato slicer and shredder, comprising a holder having a feed opening, a rotary cutting disk mounted for rotation about an axis beneath said opening, and a tray hinged above the axis of rotation forward of said opening and adapted to support a potato engaging with the working surface of the disk.

5. In a potato slicer and shredder, a holder having a feed opening, a rotary cutting member on the holder adapted to engage a potato passed through said opening, and a tray hinged at the lower edge of the opening above the axis of rotation of the cutting member and adapted to be moved forward by hand pressure toward the working surface of the disk opposite the opening.

In testimony whereof I have affixed my signature.

ROY D. MAINE.